Figure 1:
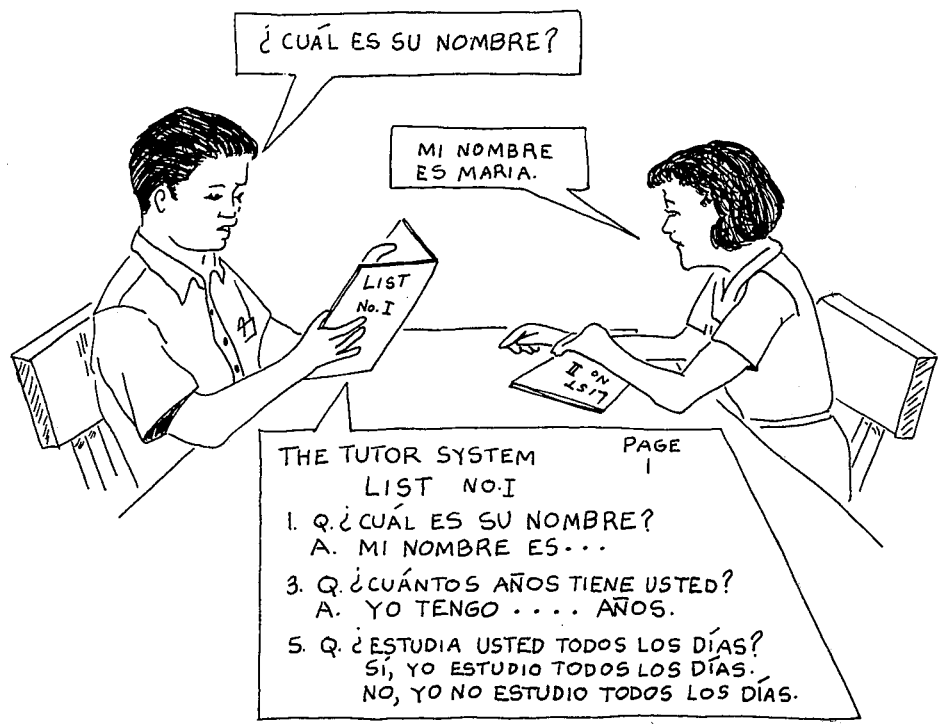

United States Patent [19]

Fernandez et al.

[11] 4,067,122
[45] Jan. 10, 1978

[54] TUTOR SYSTEM

[76] Inventors: Santiago Julio Fernandez; Maria del Carmen Fernandez, both of 45-475 Verba Santa Drive, Palm Desert, Calif. 92260

[21] Appl. No.: 623,320

[22] Filed: Oct. 17, 1975

[51] Int. Cl.$^2$ ............................................. G09B 19/06
[52] U.S. Cl. ..................................................... 35/35 R
[58] Field of Search .................... 35/35 R, 35 J, 35 E; 283/46

[56] References Cited

U.S. PATENT DOCUMENTS

| | | | |
|---|---|---|---|
| 1,271,856 | 7/1918 | Cook | 35/35 JX |
| 2,385,452 | 9/1945 | Lande | 35/35 R |
| 3,081,560 | 3/1963 | Agud | 35/35 R |
| 3,744,154 | 7/1973 | Pott | 35/35 R |

*Primary Examiner*—Richard J. Apley

[57] ABSTRACT

The teaching device of our invention comprises two lists of questions numbered I & II containing a plurality of questions in a given language.

The questions contained in each list are numbered and followed by an answer that serves as a model of the grammatical structure that should be used in answering them correctly. List I contains questions successively numbered with odd numbers (1-3-5-7-9 . . .), and List II contains questions successively numbered with even numbers (2-4-6-8-10 . . .). The question are designed and coordinated so as to simulate a conversation. In use, two students are paired off, with one student using List I and the other student using List II. The student using List I initiates the conversation by reading question #1 aloud to the other student who then answers the question without the help of any printed matter. This forces the student answering the question to develop his own response. Afterwards, it is his turn to read question #2 from List II aloud. After the student using List I answers question #2 without the help of any printed matter, it is his turn to ask question #3 to the student holding List II, and so on. If one of the students fails to answer correctly, the other student teaches him how to answer correctly using the model answer that follows the question. This exchange of questions, answers, and tutoring provides the oral practice needed to develop the skills of speaking the target language fluently.

2 Claims, 2 Drawing Figures

TUTOR SYSTEM

FIELD OF USE

This invention relates generally to teaching devices. In particular, it relates to a teaching device wherein questions are coordinated using two or more lists of questions in order to stimulate a conversation between two or more students as means of developing their speaking skills in a foreign language or in English.

DESCRIPTION OF PRIOR ART

Various types of teaching devices are available for teaching the grammar, pronunciation, reading and writing of languages, but none has been successful in developing the skill of speaking the target language fluently. For this reason, students with a real desire to learn how to speak a foreign language have had to go to the country where that particular language is spoken in order to obtain the conversational practice needed to develop their speaking skills; or contract the services of a personal tutor fluent in the target language.

It has been the practice, up to now, of printing all matters relevant to the teaching of a given language in a single book. Such books contain the grammar of the language, its basic vocabulary, repetition drills, plus narratives or short dialogues followed by questions about their content. These questions are used by the teacher to obtain oral responses from the students as a means of developing their analytical and descriminatory powers in the selection of the grammatical structures they must use in order to convey meaningful oral messages; in other words, to develop their ability to speak the language fluently. However, due to the fact that the instructor must give his attention to no less than 20 students at a time, each student is limited to a few minutes, at best, of oral practice per class period, something which is totally inadequate in developing the speaking skills. Therefore, the use of a single book does not allow a conversational situation among students without the direct participation of the teacher.

U.S. Pat. No. 1,271,856, issued July 9, 1918 to W. E. Cook for Card Games Means discloses a teaching device consisting of cards numbered successively and containing questions and answers printed on the face of them in the following way: Card number one contains question #1 followed by its answer. Card number two contains at the top of it the answer to question #1, below it contains question #2 followed by its answer. Card number three contains at the top of it the answer to question #2, below it contains question #3 followed by its answer, and so on. The inventor suggests that the number of cards should be limited to 60. This device makes possible for one player to read a question aloud from one card, and for another player holding the following card to answer the question by reading aloud the answer printed at the top of his card. Students using this previous art device do not have to use their own cognitive and discriminatory powers in answering the questions since they have access to the printed answers corresponding to the questions they must answer. The significance of our invention in relation to this aspect of previous art devices lies in the fact that by means of suppressing the printed answer in the material held by the student answering the question a totally different result is obtained.

The purpose of our invention is to force the students to use their own cognitive and discriminatory powers in selecting the words and correct grammatical structures involved in answering the questions they are asked. The function of the device disclosed by prior art is to force the students to read aloud. Clearly, the skills involved in each exercise are different. It is a proven fact that one person can master the skill of reading printed matter aloud in a foreign language without even knowing what he is saying. But no person can answer a question if that person does not make use of his cognitive and discriminatory powers in order to make the adequate choices of vocabulary and grammatical structures necessary to convey a meaningful message. It follows that the result obtained by the device disclosed by prior art is related to the development of the skills involved in reading aloud, while the result obtained through the use of our invention is related to the speaking skills.

Another disadvantage of some prior art teaching devices is that the cards containing the questions and answers are separable, and to use them a complicated set of rules must be followed; therefore they are difficult to manipulate, easily lost, subject to possible errors in their use, time consuming, and seriously limits the amount of material that can be covered if the set of cards is kept within manageable conditions. All of these inconveniences are avoided by our invention which component parts are kept together to facilitate its use. This constitutes valuable improvement upon prior art devices.

SUMMARY OF THE INVENTION

A teaching device in accordance with the present invention is particularly well adapted for teaching the skill of speaking foreign languages fluently, but it could be utilized as well to teach English or any other subject besides languages.

A teaching device in accordance with the present invention comprises two lists of questions containing questions numbered successively and coordinated so as to simulate a conversation. Questions numbered with odd numbers (1-3-5-7-9 etc.) are printed in one list (I), and questions numbered with even numbers (2-4-6-8 etc.) are printed in the other list (II). Every question in both lists is followed by a answer that indicates the grammatical structure that should be used in order to answer it correctly. The foregoing structurally arranged components constitute the language teaching device of our said invention, adapted to be used by two students in developing their speaking skills in the use of a foreign language or English.

The nature and scope of our present invention will be more fully understood from the following description taken in connection with the accompanying drawings forming part hereof, in which FIG. 1, is a plan view of two students in which the male student at the left is reading question number 1 from his list (I) to a female student at the right. The girl is answering the question without the use of any printed help. In doing so, she must produce the answer using only her own knowledge and skills. In this respect the result obtained using the device of our invention is totally different to the result obtained using the device disclosed by Cook, in which the student reads the answer from a card as opposed to constructing his/her own answer. An enlargement of the first page of the list (I) held by the boy allows us to see that the questions printed in that list (I) are numbered with odd numbers (1-3-5-7 etc.), and that each question is followed by a answer that indicates the grammatical structure that should be used in order to answer the question correctly. This model answer allows the student asking the question to check the correctness of the answer given by the other student. The student answering the question is not restricted to give a fixed answer—as is the case in Cook's Card Game—but rather is allow to express his/her own thoughts. If the answer is not embodied in the correct grammatical structure, the student asking the question can correct the student giving the wrong answer, thus teaching him/her to use the appropriate grammatical structure. The result obtained is very similar, if not identical, to what happens when a person is learning a foreign language from a personal tutor that is proficient in the speaking use of the target language. The use of the device of our invention allows any student to function as a competent instructor by using the clue that follows each question to teach his fellow student while, at the same time, he reinforces his own knowledge about the structure he is teaching.

Figure 2:

FIG. 2, represents the same two students. This time the girl at the right is reading question number 2 out of her list (II) to the boy at the left. The boy is answering the question without the use of any printed answer. An enlargement of the first page of list (II) permits us to see that the questions are numbered with even numbers (2-4-6-8 etc.), and are followed by a model answer that will allow the girl to check the correctness of the answer given by the boy, and to teach him the appropriate grammatical structure he should use if he fails to answer correctly.

Contrary to what occurs with the structural arrangement of the teaching device disclosed by Cook, students using the device of our invention are forced to use their own cognitive processes in order to produce the correct answer. And, as we already have shown, this is the only way to develop the skill of speaking any language fluently. Using the prior art's Game, students mechanically read from a card the answer to a question. This, as has already been proven by many years of experience in the schools of this country, contributes very little, if anything, to the development of the speaking skills of the students in the use of the foreign language they are studying. On the other hand, while the use of the list format allows us to compact into a single, highly practical package all of the questions necessary to cover all of the possible situations in which the target language can be used, prior art games seriously limits the number of questions that can be presented in a set of cards.

The result of using the teaching device of our invention is an interrupted conversation in the target language between two students without the need of a teacher directly participating in it. To obtain this result, it is enough that the students involved follow the normal numerical order (1-2-3-4-5-6 etc.) in the exchange of questions. There is no need to manipulate the elements that form the device in an special manner, nor is there a need to use unrelated objects to hide or show the material used by the students as it is the case when the device disclosed by prior art is used.

The above description corresponds to a preferred arrangements of materials; however, it does not exclude the use of more than two lists in order to allow three or more students to participate in the conversation. This could be achieved by numbering the questions in the lists in the proper sequence. For instance, in order to allow three students to participate, the questions would be numbered in the following manner:

list 1, 1-4-7-10-13 etc.
list 2, 2-5-8-11-14 etc.
list 3, 3-6-9-12-15 etc.

The technique used in our teaching device of separating the questions with its answers into two or more lists makes it possible:

a. To coordinate the questions so as to simulate a dialogue among two or more students.

b. To individualize, to an ideal degree, the instruction of the target language by pairing students in accordance with their abilities and their level of development in the use of the target language.

c. To provide intensive and extensive oral practice in a conversational situation, never before obtained through the use of the single book concept.

Besides, the new and useful functions and results described above as the direct consequence of printing the questions and their answers in two different lists, the device is simple and convenient to use, and has no detachable parts that can be misplaced, lost or improperly assembled, and it is not limited in the amount of material that can be covered by physical limitations.

We claim:

1. A language teaching device to be used by a plurality of users comprising, in combination, at least two distinct and unique lists, each of said lists comprising a plurality of bound sheets and containing a selected number of questions in the given language followed respectively by at least a portion of its model answer in the given language to be elicited by the user receiving the question; the totality of questions being constituted by a sequentially numbered set, the sequence alternating between the respective user's lists, the questions of each list being so designed and coordinated as to simulate a conversation.

2. The method of teaching a given language to a plurality of users comprising the steps of:
 a. providing each user with a distinct and unique list, wherein each list comprises a plurality of bound sheets and containing a selected number of questions in the given language followed respectively by at least a portion of a model answer in the given language, the totality of questions being constituted by a sequentially numbered set, the sequence alternating between the respective user's lists, the questions of each list being so designed and coordinated as to simulate a conversation;
 b. commencing with the user having the list with question number one, said user asking said question and eliciting an answer in the given language by the recipient thereof which is intended to conform to the model answer appearing with said question;
 c. proceeding to the user having the list with question number two, said user asking said second question and eliciting an answer in the given language by the recipient thereof which is intended to conform to the model answer appearing with said second question;
 d. continuing this alternating pattern throughout the set.

* * * * *